United States Patent [19]

Margolin et al.

[11] 4,445,632

[45] May 1, 1984

[54] FIBER OPTIC SCRIBE AND CLEAVE TOOL AND METHOD

[75] Inventors: Mark Margolin, Lincolnwood; David Margolin, Skokie, both of Ill.

[73] Assignee: East-West Precision, Inc., Chicago, Ill.

[21] Appl. No.: 334,531

[22] Filed: Dec. 28, 1981

[51] Int. Cl.³ .......................... C03B 37/16; B26F 3/00
[52] U.S. Cl. ...................................... 225/2; 225/96.5; 225/101
[58] Field of Search .................. 225/2, 96.5, 101, 105; 65/2, 10.2; 83/883

[56] References Cited

U.S. PATENT DOCUMENTS

| | | | |
|---|---|---|---|
| 2,523,936 | 9/1950 | Axelsen | 81/95 |
| 2,871,622 | 2/1959 | Singer et al. | 225/96.5 |
| 3,160,339 | 12/1964 | Love | 83/886 X |
| 3,667,662 | 6/1972 | Gilford et al. | 225/96.5 |
| 3,934,773 | 1/1976 | Chinnock et al. | 225/2 |
| 3,981,422 | 9/1976 | Moore | 225/2 |
| 4,017,013 | 4/1977 | Hawk et al. | 225/96.5 |
| 4,027,814 | 6/1977 | Gloge et al. | 225/104 |
| 4,074,840 | 2/1978 | Fulenwider et al. | 225/96.5 |
| 4,154,385 | 5/1979 | Lewis | 225/96.5 |
| 4,159,793 | 7/1979 | Belmonte et al. | 225/96.5 |
| 4,168,026 | 9/1979 | Lukas et al. | 225/96.5 |
| 4,202,475 | 5/1980 | Hirai et al. | 225/96.5 X |
| 4,257,546 | 3/1981 | Benasutti | 225/96.5 |
| 4,274,572 | 6/1981 | Dunn et al. | 225/96.5 |

Primary Examiner—Frank T. Yost
Attorney, Agent, or Firm—McCaleb, Lucas & Brugman

[57] ABSTRACT

A method for breaking or severing a rod of brittle fiber material, such as glass optical fiber, to produce a mirror end surface thereon, normal to its longitudinal axis and free of imperfection, is described wherein a linear section of the fiber, usually stripped of its outer protective coating or cladding, is supported and held at and between spaced zones and sequentially subjected to gradually increasing axial tension while its exterior surface is scored by a rotatable cutter or scoring wheel moving in and along a plane normal to the longitudinal axis of said section to effect its separation or cleavage along said plane. An adjustment system to accommodate different sizes and types of fiber optic materials is provided for regulating the axial tension imposed on said section, the angle of attack and scoring pressure exerted by the cutter wheel, the distance of the plane of severance relative to the mounting zone for an optical fiber connector fitting and the holding or radial gripping force exerted on the fiber. The sequential steps of tensioning and scribing or scoring the fiber also are selectively reversible. A manually actuatable tool for accomplishing the foregoing events is also described wherein the program of holding, tensioning, scoring and cleaving of the fiber is carried out independently of manually applied tool operating force.

22 Claims, 8 Drawing Figures

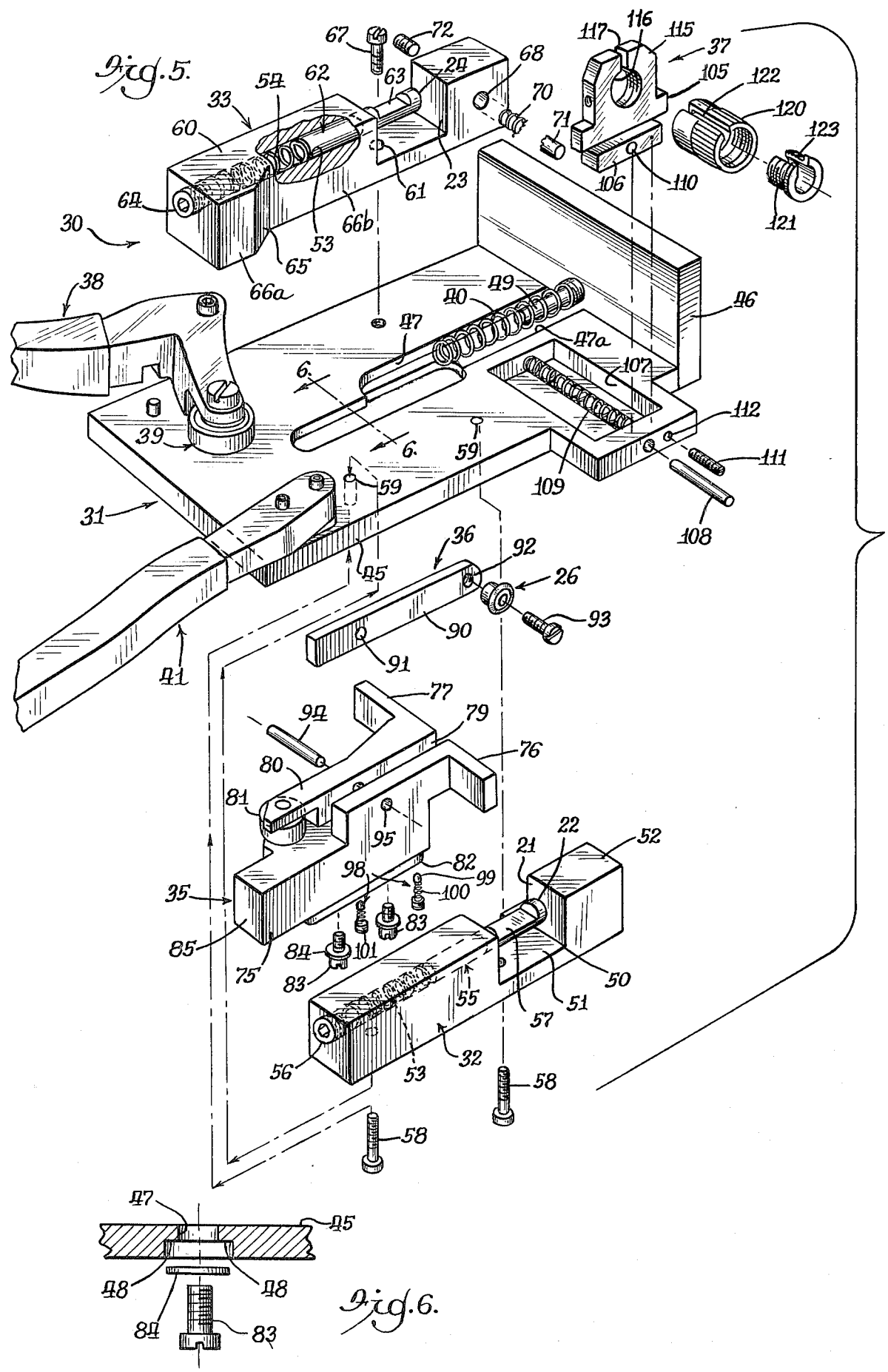

FIBER OPTIC SCRIBE AND CLEAVE TOOL AND METHOD

This invention relates to an improved method for scribing and cleaving fiber optic materials and to tool means for carrying out the method.

BACKGROUND OF THE INVENTION

The relatively widespread and ever increasing utilization of high quality fiber optic materials, usually glass or optical plastic, for use in optical wave guide communication systems, data processing and other signal transmission systems has created a demand for satisfactory and efficient means of interjoining terminal ends of adjacent fiber lengths without appreciable loss of signal energy through the junction. It has been found that such terminal ends of the fibers transmit light energy signals with minimum loss of signal when the end of the fiber itself is optically flat with a mirror smooth surface lying in a plane perpendicular to the longitudinal axis of the fiber filament.

In the early stages of employing fiber optic filaments, a variety of methods and techniques were developed, many involving rough, imprecise cutting of the fiber using scissors, side cutters, or similar cutting tools which, however, produced a ragged, crooked, cracked or non-perpendicular optically irregular surface on the fiber filament. These rough end surfaces were then cast in epoxy of plastic and ground and polished to a perpendicularly oriented, optically correct surface. In still other instances, hand-held or cumbersome bench mounted tools, involving fiber scribers and cutters, usually fixedly mounted and made of hardened metal or diamond sharpened to a conical or chisel formation, have been used for scoring the fiber materials. In such prior tool developments, the fiber is normally supported on its bottom side over a supporting surface while it is being scored. In still later developments, it was discovered that by bending the fiber over a curved surface during the scoring operation, sufficient tension was imposed on the fiber filament to produce a relatively clean cleavage or break surface thereon. However, in the bending-tensioning operations because part of the fiber filament is under compression while the remainder thereof is under tension, an optically inferior surface results at the break plane through the filament. These inferior surfaces are normally compensated for by using an optical refractive matching fluid or by grinding and polishing the same to correct the defects.

By and large, past efforts in this art have failed to develop a consistently dependable system for achieving an optically perfect end surface in and along the fracture plane of the glass or other rigid fiber optic material. One of the difficulties in such past efforts has centered about the utilization of rigid scribing instruments such as a fixedly mounted ground diamond point which, when moved across the surface of the glass fiber, produces a torsional load on the fiber, creating unwanted forces in the fiber body susceptible of producing errant fractures which are damaging to an optically perfect break surface. Additional deficiencies in such prior known score and cleave tools reside in their inability to accommodate fibers of differing diameters and characteristics, the incapabability, as mentioned, of providing uniformed tensile stress along the axis of the fiber to effect a clean mirror and optically perfect break surface, the inability to regulate the radial forces with which the fiber is gripped and held in a tool and the lack of any means for regulating the scoring pressure and attack angle of the scribing instrumentality employed, whether it be a ground diamond or hardened metal. In other instances, particularly in the hand held or hand operated tools, the operating forces applied by the operator's hand to effectuate the sequence of events, are reflected in and vary the forces imposed on the fiber itself. This is particularly undesirable inasmuch as uniformity of cutting conditions are required to obtain a consistently repeatable capability of cleaving the fibers with optically correct end surfaces.

Typifying some of the prior developments embodying the general features as hereinabove discussed are the following U.S. patents: U.S. Pat. No. 3,934,773 issued to Chinnock et al; U.S. Pat. No. 3,981,422 issued to J. R. Moore; U.S. Pat. No. 4,017,013 issued to Hawk et al; U.S. Pat. No. 4,027,814 issued to Gloge et al; U.S. Pat. No. 4,074,840 issued to Fulenwider et al; and U.S. Pat. No. 4,168,026 issued to Lucas et al. The scribe-and-cleave methods and instrumentalities disclosed in the above listed patents generally include the steps of scribing or scoring and applying tensile stress to the fiber for purposes of propagating the scribe or score plane diametrically through the fiber which is commonly supported by a backing member or anvil having or movable into a curved configuration to facilitate the application of the tensile forces.

BRIEF SUMMARY OF THE INVENTION

In recognition of the above-noted deficiencies and shortcomings of prior developments in the art of scribing and cleaving optic fibers, the present invention is directed to improvements in prior known instrumentalities and the methods of separating optic fibers by scribing and cleaving the same. Briefly, the current invention modifies the prior scribe and cleave techniques or methods by gripping a linear section of the fiber between spaced holding zones, scribing the fiber at a desired location between such holding zones by means of a rotatable cutter or scribing wheel and selectively placing said linear section under axial tension load to facilitate the cleavage and separation of the fiber along a plane perpendicular to its longitudinal axis and coincident with the plane of the scribing wheel. Cleavage and separation of the fiber ends is effected by the tension load applied to the linear section and desirably to that end at least one of the holding zones is movable away from the other. In order to accommodate the utilization of the method with fibers of various characteristics and diameters, tool means are provided having means for regulating and adjustably varying the tension imposed on the section to be cleaved as well as adjusting and regulating the angle at which a rotatable scribing wheel attacks the exterior of the fiber and the amount of scribing pressure applied to the fiber by such wheel. In addition, adjustable means are provided for regulating the radial forces applied to the fiber for holding or gripping the same at the spaced locations. Such tool preferably is manually operable, lightweight and portable for use in the field. However, the same is easily adapted for bench-mounted application. Means also are provided in the tool for regulating the location of the fiber cleavage so as to accommodate the adaption of the fiber to various connector devices available for interjoining abutting ends of optic fibers in providing terminal connection thereof. This feature permits the separation or cutting of the fiber at precise locations selected in accordance with the requirements of the particular connector fitting employed.

It is a principal object and purpose of this invention to provide an improved method of scoring and cleaving optic fibers so as to effectuate optically perfect end surfaces thereon.

It is a further object of this invention to provide a tool for carrying out the method set out in the preceding object which is capable of utilization in the field or as a bench-mounted instrumentality.

It is still another object of this invention to provide a tool for scoring and cleaving optic fibers as set out in the preceding objects which is readily portable and manually operable in an easy and convenient manner.

It is a further object of this invention to provide a scoring and cleaving tool for effectuating optically perfect end surfaces on optic fibers which is fully adjustable to accommodate optic fibers of various characteristics and diameters and which is dependable in operation to provide repeated separations or cleavages of optic fibers having the same characteristics with uniform results.

A still further important object of this invention is to provide a tool for scribing and cleaving optic fibers which is capable of separating optic fibers at specified and precise locations, for the purpose of accommodating different types of fiber optic connector devices.

It is an additional object of this invention to provide an improved fiber optic scribing and cleaving tool which is relatively simple in its construction, economical to manufacture and dependable in operation.

Having described this invention, the above and further objects, features and advantages thereof will be recognized by those familiar with the art from the following detailed description of a preferred embodiment illustrated in the accompanying drawings and presenting the best mode presently contemplated for enabling those with skill in the art to practice this invention.

IN THE DRAWINGS

FIG. 5 is an exploded perspective view of a hand operated tool capable of performing the method outlined in FIGS. 1 through 4, in accordance with this invention;

FIG. 6 is a cross-sectional view taken substantially along line 3—3 of FIG. 5;

DESCRIPTION OF THE PREFERRED EMBODIMENT

Scribe and Cleave Method

With initial consideration of the improved method of this invention, references is made to FIGS. 1 through 4 of the drawings illustrative of the procedure and program steps involved therein.

Figure 1:
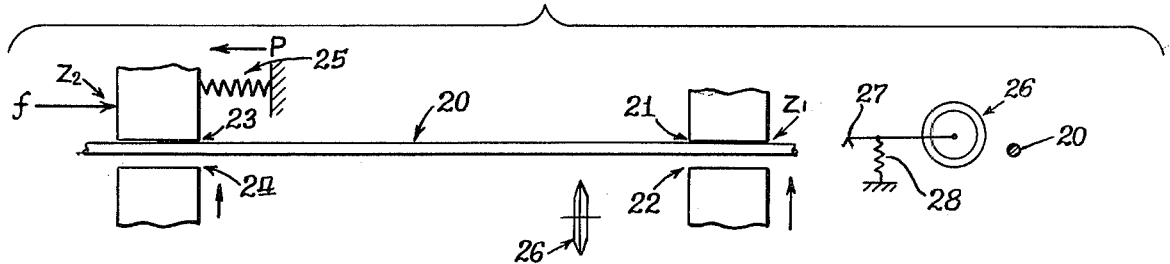
FIGS. 1 through 4 are schematic illustrations of the various steps and functions performed in accordance with the method of this invention.

As indicated in FIG. 1, a section of optical fiber 20, in this case stripped of its outer protective coating, is disposed between spaced holding zones $Z_1$ and $Z_2$, depicted as including cooperating pairs of gripper means 21, 22 and 23, 24. In mounting the fiber 20 in and between such holding zones, the portion or section thereof to be cleaved is disposed in a linear condition, unsupported except for its engagement at the spaced holding zones.

It will be noted that the gripper pairs 23, 24 is subjected to a force P, furnished as by spring means 25, tending to urge or move the gripper pair 23, 24 of zone $Z_2$ in a direction away from the gripper pair 21, 22 of zone $Z_1$. Thus, at least one of the holding zones, according to the method of this invention, is movable relative to the other. It also will be noted that the force P, acting to separate the holding zones, is opposed by a counterforce f also shown as acting on the movable gripper pair 23, 24. Desirably, movement of the holding zone $Z_2$ relative to the other stationary holding zone $Z_1$ is generally along the linear axis of the exposed fiber filament 20.

A rotatable scribing wheel 26, mounted to move vertically, as about a pivot fulcrum 27 (indicated at the right side of FIG. 1), is aligned in a plane AA disposed at right angles to the lengthwise axis of the fiber 20. The wheel 26 is also movable linearly in and along such plane AA to effect its scribing operation. It will be understood from diagrammatic FIG. 1 that as the scriber wheel 26 moves about its pivot fulcrum 27, the same is biased toward the fiber by means of an adjustable spring 28. This serves to regulate and adjustably change the pressure with which the wheel 26 engages the fiber 20. In addition, the angular dispostion and vertical location of wheel 26, relative to the body of the fiber 20 at initial engagement, is adjustable to regulate the angle of attack or engagement of the scriber wheel with the fiber 20 in operation.

Figure 2:
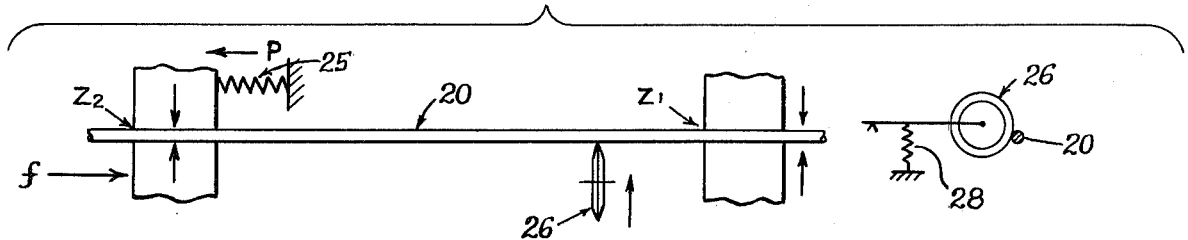

To initiate the scribing and cleaving activity according to this invention, the conditions indicated in FIG. 2 are brought about by shifting the gripper pairs 21, 22 and 23, 24 in a manner to engage and radially grip the fiber 20 therebetween, thus defining two separated or spaced holding zones $Z_1$ and $Z_2$. In this regard, it is not essential to the practice of this invention that each of the spaced holding zones each constitute a pair of movable grippers as indicated. At least one of the holding areas or zones for instance may constitute means for merely longitudinally anchoring the fiber 20, as by abuttingly engaging the outer cladding or protective outer coating to hold the fiber against axial movement.

In the condition of events indicated in FIG. 2, force P is exerted on the now closed gripper members 23, 24 and is initially opposed by the counterface f, preventing movement of zone $Z_2$ relative to zone $Z_1$. However, at this stage, the fiber 20 is in a linear state extending between the two gripping zones. So-held, the fiber 20 is in position for attack by the scribing wheel 26 disposed at a desired angle of attack depending on its adjusted vertical position.

Figure 3:
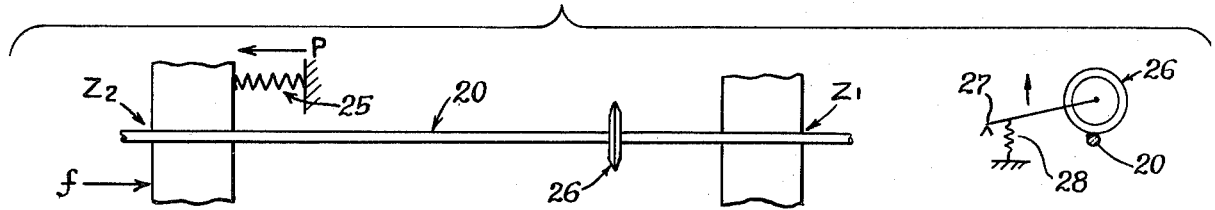

FIG. 3 depicts the event of scoring the fiber 20 by the rolling activity of the scriber wheel 26. As illustrated, with the fiber 20 stretched between the spaced holding zones, the scriber wheel 26 moves in and along the plane AA engaging the exterior of the fiber and rolling upwardly and over its exterior with scoring force in this illustrated case; acting so as to minimize rotation or torque load on the fiber. Meanwhile, the force f, opposing the tensioning force P may remain equal to the force P, as in the FIG. 2 situation, or may be suddenly or gradually reduced, increasing the effect of force P and the tensile forces on the fiber 20 during the actual scribing and scoring operation. As previously mentioned, due to the adjustability of the scribing wheel 26, both as to elevational position relative to the longitudinal axis of fiber 20 to produce a desired attack or approach angle of the wheel with the fiber, and regulation of the spring means 28 for applying scoring force to the wheel, the angle of attack and the scribing pressures are selectively varied to satisfy fiber material and diameter requirements.

Once the scribing wheel has passed over the exterior of the fiber 20, completing its scribing and scoring cycle, the force f opposing the tensioning force P on fiber 20 is fully released, permitting force P to move the second holding zone $Z_2$ (comprising the gripper members 23, 24 in the illustrated case) away from the holding zone $Z_1$ and cutting plane AA of the scribing wheel. As a result, the fiber 20 is cleaved or separated into two sections 20a and 20b, the latter moving with the second holding zone $Z_2$. This completes the scribing and cleaving operation according to the improved method of this invention. Since the separating force P is adjustable, it may be optimized for a variety of fibers or fixed optimally for a single given fiber.

Figure 4:
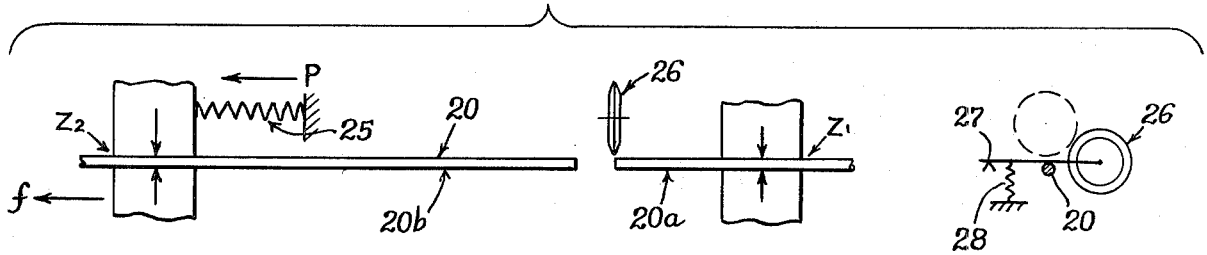

It will be observed with respect to the activity of the scribing wheel 26 that depending on the adjusted position of the angle of attack, it is possible to scribe a substantially 180° path about the exterior of the fiber 20. Such 180° scribing path is not essential to the successful scribing and cleaving operation, although it is helpful in certain classes of materials utilizing for optic fibers, particularly at larger diameters. Further, while the force f (FIG. 3) has been described as being equal to or less than the force P at and during the scribing operation, this is a matter of choice and selection, again depending on the characteristics of the particular optic fiber being treated. For example, it may be desirable in certain instances to avoid any particular tension loads on the fiber during the scribing operation, such as when the fiber material is extremely brittle and easily fractured. In that event, the scribing movements by the wheel 26 will normally suffice to effect the desired planar fracture therethrough. In other instances, however, it has been found desirable to actually place the fiber 20 under tension load during and throughout the scribing operation. In that event the force f is gradually lessened permitting a gradual increase of tension forces in and along the fiber 20 as the scribing wheel approaches and attacks the exterior of the fiber. In either event, once the scribing function is completed, it is necessary, that sufficient tensile force to applied to the fiber to effect the cleavage and separation of the fiber ends at and along the scribing plane as illustrated in FIG. 4.

Scribe and Cleave Tool

In order to carry out the program of the above-described method, a tool means 30, illustrative of one type of manually operable device capable of performing the various method steps described, is set forth in FIGS. 5–9 of the drawings, to which reference is now made.

As there shown, the tool means 30 comprises a generally planar or plate-like support means 31 on which are mounted laterally spaced right and left hand fiber supporting assemblies 32 and 33 comprising the above-noted clamping means 21, 22 and 23, 24. Disposed centrally of the support means 31 is an actuator means 35 carrying a scriber assembly 36 having a pivotally mounted scriber arm supporting the scriber wheel 26 at one end. Means 35 and the scriber assembly are movable with longitudinal reciprocating action generally along a plane passing through the central longitudinal axis of the support means 31. Fiber guide means 37 are provided on one side of the support means 31 for guiding an optic fiber 20 into operative alignment with the two holding zones $Z_1$ and $Z_2$ and more particularly with the clamp means 21–24 of assemblies 32 and 33.

Suitable means for reciprocably activating the actuator means 35 are provided comprising, in the illustrated cases, a pivotally mounted, manually operated, bell crank handle operator means 38 having a rotatable roller means 39 at the outer end of one leg thereof, for engaging the actuator 35. Advancing movement of the actuator means 35 is opposed by an adjustable return spring means 40. A fixed handle means 41 is also mounted on the support means 31 for cooperation with the bell crank 38 whereby the latter may be manually actuated through squeezing action of an operator's hand to move actuator 38 toward the fixed handle means 41.

Having described the major components of the tool means 30, the specifics thereof will now be set forth.

The support means 31 is formed as a rectangular generally planar metal base plate 45 having an upstanding wall portion 46 at one outer end thereof. An elongated opening 47 is formed through the base plate 45, substantially centrally thereof, for purposes of mounting the actuator block 35 thereon. As shown best in FIG. 6 of the drawings, opening 47 is undercut and laterally enlarged along its underside to provide aligned shoulders 48, 48 along its lateral sides, for reasons which will appear presently.

The end wall portion 46 is provided with a central threaded opening (unnumbered) aligned with the slotted opening 47 and with a recessed channel 47a formed in the top face of plate 45. The return spring means 40 is disposed in and along this channel and engages the block 35 at one end. An adjustment screw and spring guide 49 (see FIG. 7) engages the other end of spring means 40. The screw 49 fits into the opening in wall portion 46 and operatively adjusts the compressive force exerted by spring 40 against the actuator means 35, as desired. In so regulating the spring 40, the manual force required to pivotally actuate the bell crank means 38 is correspondingly regulated to fit the the operator's grip and feel. However, the forces applied to the bell crank 38 are entirely independent of the scribing and cleaving forces developed by the tool 30 and are in no way applied to the fiber per se.

Turning now to the two fiber supporting assemblies 32 and 33 (which include the two holding zones $Z_1$ and $Z_2$ of FIGS. 1–4), such assemblies may be identical, although in the particular illustrated embodiment there are slight variations therebetween, as will appear presently.

The right hand assembly 32, as is best illustrated in FIG. 5 of the drawings, comprises an elongated metal member having a generally rectangular parallelopiped shaped body, designated 50. Body 50 is distinguished by a transverse recess or cut-away area 51, milled or otherwise formed inwardly of its upper surface 52 and located adjacent one outer end of the body 50. An elongated cylindrical bore 53 is formed inwardly of the other or inner end of body member 50 for reception of a compression spring means 54, a cylindrical gripper plunger member 55 and a threaded adjustment screw 56. The plunger slides axially along this bore toward an opposing wall of the recess area 51 which forms the gripper means 21; the outer end face of the plunger comprising the gripper means 22. Regulation of the force exerted by the plunger against the gripper face 21 is effected by adjustably threading the screw means 56 toward and away from the plunger 55 to vary the compression of the intervening spring means 54. Since the other end of the plunger 55 also comprises the gripper means 22, adjustment of spring 54 thereby adjusts the holding force exerted on an optic fiber by the gripper means 21, 22. If desired, such gripper force may be cushioned by providing an elastomeric covering over the vaces 21, 22.

For purposes of regulating and determing the opening and closing movements of the gripper plunger 55, the latter is cut away adjacent, but behind it gripper end face 22, to provide a substantially semi-cylindrical recess 57 cooperative with the actuator means 35, as will be explained hereinafter.

The right hand assembly 32 preferably is stationarily fastened to the base plate 31 as by spaced machine screw means 58, 58 which pass through spaced openings 59 in the base plate 45 for threaded engagement with cooperating openings (not shown) formed inwardly of the bottom side of the body member 50.

Turning now to the particulars of the left hand supporting and holding assembly 33, it will be recalled that its structural make-up is substantially identical to the assembly 32 just described. To that end, the same comprises a rectangular parallelopiped body 60 having a cut away recess 61 near its outer end which is aligned to oppose the recess 51 of assembly 32 in operation. As before, the body 60 of assembly 33 is provided with an internal bore 53 which houses a spring means 54 and a plunger member 62 having a semi-cylindrical recess 63 near its outer end, which comprises the gripper means 24 for cooperation with the opposing gripper wall 23 of the recess 61. Adjustment screw means 64 thread into the outer end of the central bore 53 in body 60 to adjust the force of the internal spring means, thereby regulating the force of engagement between the plunger's gripper end 24 and the opposing gripper wall 23, which also may be covered with elastomeric material to promote gripping engagement, all in the manner as described for assembly 32.

The principal distinguishing difference of assembly 33 from the right hand assembly 32 first described, lies in the provision of a face cam along one sidewall thereof. Specifically as best shown in FIG. 5, the sidewall of body 60, located closest to the actuator means 35 in operation, is cut away to provide a sloping cam surface 65 which intersects adjacent sidewall portions 66a and 66b. This sloping surface 65 constitutes a linear cam means for effecting pivotal movement of the assembly 33 at selected periods of the scribing and cleaving program whereby to impose axial tension forces on the fiber section.

To enable such pivotal activity of the assembly 33 to take place in response to activation by the cam means as above described, a pivot screw means 67 is employed to fasten and mount the assembly 33 to the base plate 45; the pivotal axis provided by the screw means 67 being located between the sloping cam face 65 and gripper means 23, 24. It goes without saying that the location of the pivot axis will determine the extent of arcuate movement of the outer end of body 60 in response to operation of the cam means 65, as will be described hereinafter.

From the above description of the two assemblies 32 and 33, it will be understood that in the illustrated embodiment, the right hand assembly 32 is stationarily mounted while the left hand assembly 33 is adapted for pivotal movement about a vertical axis, as the tool is oriented in FIG. 5. It will be recalled from the description of the method of this invention that a force P is applied to at least one of the holding zones to effectuate tensioning of the fiber and ultimate cleavage and separation of its ends. To this end, the body 60 of the movable fiber supporting assembly 33 is provided with a transverse bore 68 located near its outer end. Bore 68 lies in a plane coincident with the longitudinal axis of the plunger means 62 so that the axis of opening 68 is transverse to the axis of plunger 62. Opening 68 is of a diameter sufficient to receive one end of spring means 70 (corresponding to spring 25 of FIGS. 1–4) and preferably a rigid spring guide rod 71 to prevent buckling of spring 70 in operation. The outer or opposite end of the opening 68 is threaded for acceptance of an adjustable screw means 72 whereby the compression of the spring means 70 may be regulated in accordance with the threaded positioning thereof. Both the spring means 70 and the guide rod 71 extend toward the opposing end portion of the right hand assembly 32 which also is suitably bored to receive the other end of the spring means 70 (see FIG. 7). So assembled, it will be understood that the spring means 70 provides the force P for urging the two assemblies 32 and 33 apart; in this instance with and by pivotal activity of the assembly 33.

Turning now to the particulars of the actuator means 35, as best illustrated in FIG. 5 of the drawings such comprises a generally elongated base block 75 which may be fabricated and cut or otherwise provided with a pair of generally L-shaped right and left hand clamp controller arms 76 and 77, respectively, which are disposed along the top side of block 75 and extend forwardly and laterally of its front wall 78. The two clamp controller arms 77, 76 are separated by an intermediate, elongated opening 79 receptive of the scribing assembly 36, as will be explained more fully presently. Block 75 also is cut away near its upward rearward corner portion to provide a rearwardly extending follower arm 80 to which is attached a rotatable follower roller 81 movable about a vertical axis and adapted to engage the camming wall portions 65, 66a and 66b of assembly 33 in operation. The bottom side of the block 75 is formed with an intermediately disposed and depending portion 82 formed to fit closely within the lateral dimensions of the slotted opening 47 in the base plate. Depending portion 82, however, is shorter than opening 47 whereby it is adapted to slide longitudinally along opening 47 with limited linear motion.

Mounting or fastening the actuator assembly 35 to the base plate is accomplished by inserting the depending portion 82 into the slotted opening 47 as above-mentioned, and employing two spaced machine screws 83, 83 and a pair of washers 84, 84 or the like. As best shown in cross-sectional FIG. 6, the machine screws 83 fit upwardly through the bottom of the slotted opening 47 with the washers 84 thereabout slidably underengaging the shoulders 48, 48. Suitable threaded openings are provided in the depending portion 81 of the block member to accept the mounting screws 83. While other modes of interconnecting the actuator assembly 35 and the base plate may be carried out, the above-described arrangment provides a simple, slidable interconnection therebetween as desired.

It will be understood that the forward wall 78 of the actuator block 75 engages the inner end of the return spring member 40 and to that end such face wall 78 may include a recessed socket receptive of one end of the spring member 40 or a raised boss insertable axially within the coils of the spring member to maintain its centralized location on the block 75.

With the actuator assembly 35 mounted on the base plate as described, it will be noted that the rear face wall 85 of block member 75 is disposed for engagement by the actuating roller 39 mounted at one end of the bell crank 38. Thus, advancing pivotal activity of the bell crank moves block 75 forwardly in and along the slotted opening 47 compressing return spring 40. Release of the bell crank results in return movement of block 75 by reaction of spring 40.

Regarding the purpose of the actuator arms 76 and 77 previously noted, such arms, in the assembly of means 35 on the base plate, extend laterally from the actuator block 75 to invade the semi-cylindrical recesses 57 and 63 formed on the two gripper plungers 55 and 62, respectively; extending across such recesses and interferingly engaging the adjacent end walls of the plunger recesses. By this arrangement, movement of the two plungers is controlled in response to movement of the clamp actuator arms 77 and 76. More specifically, in the open or non-actuated condition of the tool whereat the actuator assembly 35 is disposed in a rearwardly or retracted position i.e. with the adjacent rear end of the central opening 47 and the depending portion 82 abutting, the influence of return spring 40 transmitted to arms 76 and 77 is sufficient to overcome the plunger springs 54, pushing the gripper plungers into their bores. Consequently, the gripper members are held in a retracted condition by and with the retracted positioning of the centrally disposed actuator assembly 35 and more specifically by virtue of their engagement with and by the arms 76 and 77 thereof. Movement of the actuator assembly 35 forwardly or toward the opposite end of the slotted opening 47 releases the plunger members 55 and 62, permitting the end wall faces 22 and 24 thereon to approach the opposing gripper walls 21 and 23, respectively, whereby to radially grip and hold an optic fiber 20 in and across the assemblies 32 and 33.

Turning now to the features and operational aspects of the scriber assembly 36, it will be recognized that such includes a linear support arm 90 having a transverse opening 91 intermediate its ends. A threaded opening 92 is provided adjacent the outer end of arm 90 to receive a machine screw 93 which passes through a central opening in the scribing wheel 26 for purposes of rotatably fastening the latter to the outer end of the arm 90. It will be appreciated that the scribing wheel has a sharpened V-shaped outer edge or periphery and preferably is made of carbide or hardened steel for purposes of producing a finite scribe line across the surface of an optic fiber engaged thereby.

Interconnection of the scriber assembly 36 with the actuator assembly 35 is brought about by means of an axle or pivot pin 94 which passes through the pivot opening 91 in arm 90 and threads into a transverse bore 95 formed through the actuator block 75. Thus the arm 90 with the scriber wheel at its outer end is pivotally supported within the elongated opening 79 on the upper side of the actuator block 75.

In order to adjustably regulate the activities of the scribing wheel 26 and its supporting arm 90, a pair of adjusting assemblies 98, 98, (see FIG. 8) each comprising an engagement member 99, spring means 100 and an adjustment screw means 101 are provided to fit into openings extending upwardly from the bottom of the actuator block 75, on opposite sides of the pivotal axis for the scriber support arm. This relationship is best shown in the cross-sectional FIG. 8 of the drawings. It will be appreciated from this latter figure that the engagement members 99 underengage the bottom edge or side of the scriber supporting arm 90 with resilient force as applied by their respective spring members 100. Adjustment of the threadably movable screw means 101 serves to vary the compression of the spring means 100 and thus adjust the force with which the members 99 engage the scriber support arm. With this arrangement, appropriate and selected individual adjustment of the screw means 101 and the two assemblies 98, 98 effectively adjusts the vertical position of the scriber wheel, accordingly regulating its angle of attack with respect to the fiber section 20 to be scribed. In addition, adjustment of the two screw means 101 may be appropriately regulated to effect or bring about a desired force with which the scriber wheel engages the exterior of the fiber 20, thereby regulating its scribing pressure. These two adjustments are particularly important in accommodating the tool assembly 30 to the scribing and cleaving of optic fibers having various physical characteristics, particularly breaking and scribing quality, as well as a range of diameters, in accordance with that objective of this invention.

Figure 7:
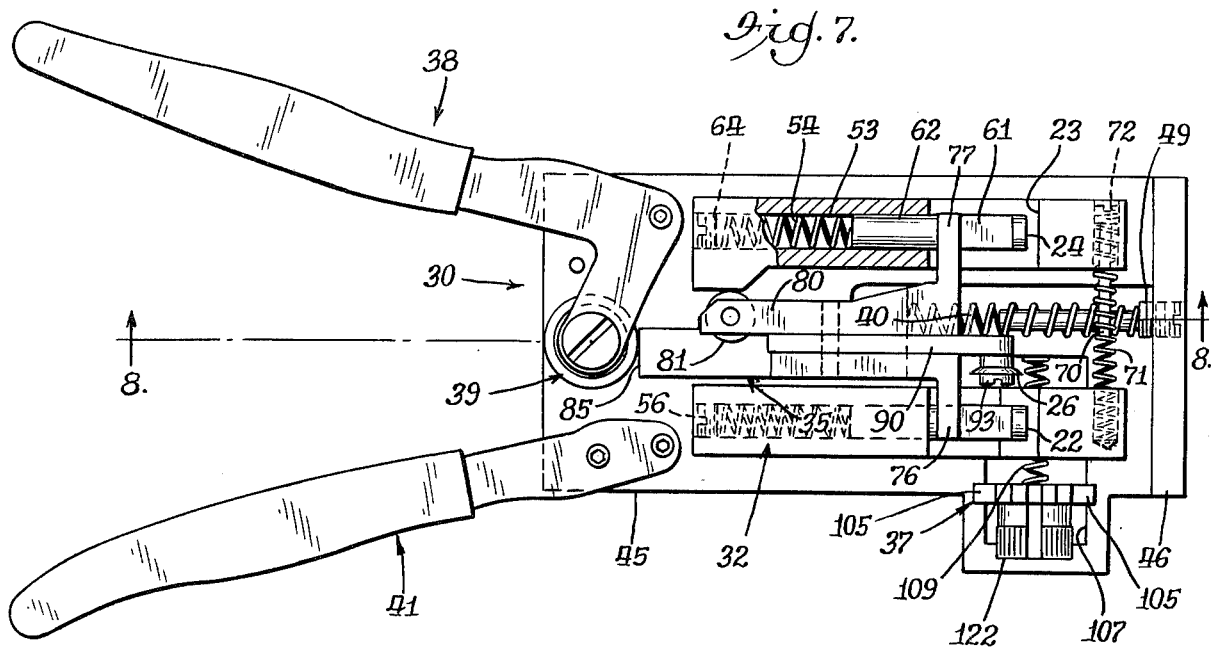
FIG. 7 is a top plan view of the assembled tool shown in FIG. 5.
Figure 8:
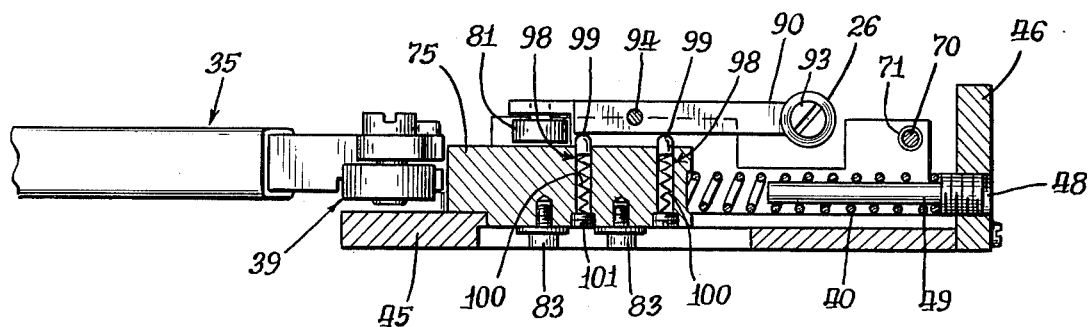
FIG. 8 is a cross-sectional view taken substantially along vantage line 8—8 of FIG. 7.

Turning now to the fiber guide means 37, the features thereof will best recognized from FIGS. 5 and 7 of the drawings. As there shown, guide means 37 comprises a cross shaped guide plate having a medially and normally horizontally disposed arm portion 105 which parallels and rides over the upper face of the plate 45 of the support means in operation. The vertical arm of this cross shaped guide plate comprises a lower depending leg portion 106 which fits into a substantially rectangular shaped socket 107 formed or cut inwardly of the upper face of the support plate 45, adjacent one end of wall portion 46 thereof. The guide plate is movable along the socket 107 and is positionable therein at selected locations. To this latter end, a guide rod 108 and a spring means 109, adapted to surround the rod 108, are mounted within the socket to oppose movement of the plate toward the stationary support assembly 32. Specifically, guide rod 108 extends through an opening 110 formed in the depending leg portion 106 of the guide plate and supports the spring 109 thereabout which then engages the opposing end wall of socket 107 and leg 106 of the guide plate. An adjustment screw 111 threads into opening 112 formed inwardly of one edge of the support plate 45 to communicate with the socket 107 and engage leg 106, opposing spring means 109 thereon. By appropriate adjustment of the screw means 111, the guide plate may be positioned at desired locations relative to the lateral edge of the support plate 45 and/or the stationary support asembly 32.

The other or upwardly extending vertical arm portion 115 of the cross shaped guide plate, is distinguished by an enlarged opening 116 which is invaded at its upper periphery by an open slot 117 through which the stripped optic fiber section 20 may be inserted. If desired, the fiber also may be axially inserted through opening 116 to align the fiber in the holding means 21–24. Optionally, a fitting collar 120 and sleeve 121, comprising part a typical optic fiber fitting, may be attached to the arm portion 115 coaxially of the opening 116 therein for receiving the stripped end of an optic fiber. As shown, the collar 120 and sleeve 121 also may be provided with slotted openings 121, 123 through which the fiber 20 may be inserted. Generally, however, when the use of the fitting collar 120 is employed, the central opening thereof closely receives the cladding or protective covering surrounding the optic fiber with the stripped fiber section 20 being inserted coaxially through the fitting collar, the opening 116 and through the two holding zones $Z_1$ and $Z_2$ comprising the gripper means 20-24. In this fashion, the scribing of the fiber at a finite distance from the end of a selected fitting member is possible. Regulating the distance between the end of the fiber cladding and the end of the cleaved fiber is readily achieved by the adjustable positioning the guide plate relative to the cleaving plane of the scribing wheel 26. Thus, the objective of providing a capability for adapting the cleaving function to a particular class of fiber optic fitting is readily achievable with a tool of the above-described order.

Having described the makeup of a typical tool 30 according to this invention, its use and operation will now be set forth. As will best be understood from FIG. 7 of the drawings, with the tool 30 in a relaxed or open position as shown, loading of the stripped fiber section 20 into and between the holding zones is accomplished by inserting the fiber through the guide means 37 and across the outer end of the plungers in the supporting and holding assemblies 32 and 33. As illustrated in FIG. 7, such assemblies are in substantially parallel interrelationship, being held in that condition by virtue of the interengagement of the cam follower wheel 81 with the surface portion 66a of the left hand assembly 33. In this condition, it will be noted that the abutment face 85 of the central actuator means 35 is disposed against the actuator roller 39 under the influence of the compressive forces exerted by the return spring means 40.

Once the fiber has been loaded as above noted, either by abutting the cladding thereabout within the fitting collar 120 or against the guide plate arm portion 115, to locate the cleavage line at a desired distance from the cladding about the fiber, the scribing and cleaving operation is ready for initiation. This takes place by squeezing the bell crank operator 38 toward the stationary handle portion 41, causing the roller means 39 thereon to advance the actuator means 35 toward the fiber section 20. As this advancing movement commences, the arm portions 76 and 77 release the two plungers 55 and 62, permitting the outer end faces 22 and 24 thereof to approach the opposing end walls 21 and 23, respectively. The fiber section 20, being located and aligned between such gripper faces 21-24, is then engaged by the plungers with an adjustable radial force as exerted by the associated plunger spring means 54. This serves to hold the fiber section 20 in a linear condition unsupported between the assemblies 32 and 33. The tool is now in the operational condition outlined in FIG. 2 of the drawings.

Continued squeezing movement of the operator means 38 toward the stationary handle 41 serves to advance the actuator means 35 for purposes of moving the scribing wheel 26 into engagement with the fiber 20. At this stage of events, depending on the location of the sloping cam face 65 of the movable assembly 33, with respect to the follower wheel 81 on the actuator assembly 35, the periphery of the follower wheel 81 will start to move over the cam face 64 until it engages face 66b on assembly 33. During this procedure, the sloping face 65 permits the inner end of the assembly 33 to pivot toward the actuator means as urged by the compressive spring means 70 extending between the two holding assemblies 32 and 33. Such activity causes the outer end of assembly 33 to move outwardly (counterclockwise) as viewed in FIG. 7 thereby placing the fiber section 20 under tensile load. This tensile loading of the fiber is gradual, depending on the rate of movement of the wheel 81 along the sloping cam face 65 and the time interval required for its movement from wall portion 66a to wall portion 66b. This condition of events and happenings is best depicted in FIG. 3 of the drawings where the scribing function of the wheel 26 takes place and the force f which opposes the force P (provided by spring means 70) is equal to or less than the force P. Force f, of course, is provided by the interengagement of the follower wheel 81 with the cam face portion 66a of the assembly 33 whereby the latter is held against the separating force imposed by the spring means 70.

Thus, by way of review, as the inner end of the block member 60 moves toward the follower wheel 81, the outer end comprising the gripper surfaces 23, 24 moves away from the stationary assembly 32 and grippers 21, 22 in accordance with the FIG. 4 illustration. This separating movement of the gripper assembly 33 effects the desired tensioning, fracturing, cleavage and separation of the fiber 20 along the plane of cleavage A—A as determined by the scribing wheel 26.

It will be recalled that according to the procedural steps involved in the method of this invention the imposition of tensile forces on the optic fiber may be regulated to occur prior to, during and/or immediately after the scribing operation effected by the scribing wheel 26. This regulation of the force P is brought about by the location and slope of the sloping cam face 65 whereby to selectively effect the pivotal actuation of assembly 33. Thus, for example, if the sloping face 65 is located closer to the outer end of assembly 33 than that illustrated, the pivotal activity of the inner end of the block member 60 thereof can be regulated to occur after the scribing function of the wheel 26; for example, after the wheel has passed totally over and beyond the fiber as illustrated in the right hand portion of FIG. 4. In that event, the tensile forces on the fiber will not be applied until after the scribing function takes place. Conversely, the application of the tensile force P may take place prior to or simultaneously with the scribing function, as in the illustrated case of FIGS. 3 and 4, which in most cases is the preferable order of events. The rate of applying tension force is determined by the slope of cam face 65, which may be regulated as desired.

In any case, once the scribing function of the wheel 26 has been completed, the fiber section 20 will separate or cleave along the scribing plane of the wheel 26 under the force P applied by the compressive spring means 70. The exact amount of tensile force applied to the fiber of course is easily regulatable by adjustment of the screw means 72, which serves to vary the compression of the spring means 70, the source of the tensile force P. This feature adapts the tool means 30 of this invention to optic fibers of varying characteristics and diameters in accordance with that objective of this invention.

Once the scribing and cleaving functions are completed as indicated in FIG. 4 for example, release of the operator bell crank 38 by the operator effects an immediate return of the actuator means 35 to its at rest position as shown in FIG. 7 under the influence of the compressive return spring means 40. Here again, the adjustment of the force required to effect advancement of the actuator means 35 is readily adjusted by virtue of the positioning of the adjustment screw means 48 for varying the force of the return spring means 40.

From the foregoing, it is believed that those familiar with the art will readily understand and appreciate the novel advancement and unique operating steps presented by the present invention. Further, it will be understood that while the illustrative tool means for carrying out the method of this invention has been set forth in association with a preferred embodiment thereof illustrated in the accompanying drawings, the same is susceptible to wide variation, change, modification and substitution of equivalents without departing from the spirit and scope of this invention as defined in the following appended claims.

The embodiments of the invention in which an exclusive property or privilege is claimed are defined as follows:

1. Manually operable tool means for scribing and cleaving optic fibers of circular cross section, comprising: a pair of spaced holding means for holding and supporting a linear section of optic fiber therebetween, means for selectively tensioning said fiber section along its longitudinal axis without bending or otherwise disturbing its linear state, and freely rotatably mounted scribing wheel means movable in and along a plane perpendicular to said longitudinal axis and operable to engageably roll over the exterior contour of said section to scribe the same along an arcuate path lying in said plane.

2. The combination of claim 1, and means for selectively programming the operational sequence of said holding, tensioning and scribing means.

3. The combination of claim 2, wherein said programming means comprises cam means operatively responsive to movement of said scribing means toward said fiber section for causing operation of said tensioning means to tension and cleave said section in pre-selected relation to the scribing operation of said scribing means.

4. The combination of claim 1, and means for selectively determining the axial force applied to said fiber by said tensioning means.

5. The combination of claim 1, wherein said spaced holding means include at least one pair of cooperative gripper means adapted to radially grip the exterior of said fiber, and means for adjustably regulating the radial force exerted by said gripper means.

6. The combination of claim 1, wherein said scribing means is mounted for rectilinear reciprocating movement toward and away from said fiber section and for movement in directions generally transverse to its axis of reciprocating movement during the scribing operation.

7. The combination of claim 6, and means for adjusting and regulating the attack angle and scoring pressure at which said scribing means engages and scribes said fiber section.

8. The combination of claim 1, including actuator means for reciprocating said scribing means in and along said plane, and manual means for operably activating said actuator means.

9. The combination of claim 8, including resilient means opposing movement of said scribing means toward said fiber section, and means for regulating the force exerted by said resilient means thereby to regulate scribing pressure.

10. The combination of claim 8, wherein one of said spaced holding means comprises a face cam and said actuator means comprises a cam follower means cooperative with said face cam whereby to effectuate lateral movement of said one holding means in response to reciprocating movement of said scribing means, said means for tensioning said linear section being operable in response to lateral movement of said one holding means away from the other said holding means.

11. The combination of claim 10, wherein said cam and cam follower means effectuate a preprogrammed sequence of operations for tensioning and cleaving said section.

12. The combination of claim 8, and means associated with said actuator means for operating said holding means to radially engage and grip the exterior of said fiber section in advance of the engagement of said section by said scribing means.

13. The combination of claim 1, and means for advancing said scribing wheel means into engagement with said section, including means permitting said scribing wheel means to resiliently engage and follow the exterior contour of said fiber section and rotatably scribe the same over a substantial arcuate path with minimal or substantially no torsional load on said section.

14. The combination of claim 1, and means for precisely positioning the location of said plane along the axis of said fiber section.

15. A method for scribing and cleaving optical fibers comprising the steps of: supporting and holding a rectilinear section of fiber to be scribed and cleaved at laterally spaced locations without any support therebetween, scribing the exterior contour of said fiber section along an arcuate path in and along a plane located intermediate said spaced locations and lying normal to the longitudinal axis of said section, and selectively tensioning said fiber section with substantially axially applied tension forces to effect cleavage of said section in and along said plane.

16. The method of claim 15, wherein said tensioning occurs prior to and during the scribing of said section.

17. The method of claim 15, wherein said tensioning occurs after said scribing of said section.

18. The method of claim 15, wherein said tensioning occurs during and after said scribing of said section.

19. The method of claim 15, wherein said tensioning is gradually increased until cleavage occurs.

20. The method of claim 15, wherein said scribing step is carried out by a freely rotatable scribing wheel.

21. The method of claim 15, wherein said scribing is effected by moving a rotatable scribing wheel in and along said plane and rotating said wheel over the exterior surface of said section.

22. The method of claim 15, wherein the steps of supporting, holding, scribing and tensioning of said fiber section are initiated by manually applied forces which are independent of the forces applied to said fiber section.

* * * * *